July 7, 1931. J. H. PIERCE Re. 18,118

MARINE PROPULSION DEVICE

Original Filed Oct. 10, 1924

INVENTOR
JAMES H. PIERCE
BY Hodgson S. Pierce
ATTORNEY

Reissued July 7, 1931 Re. 18,118

UNITED STATES PATENT OFFICE

JAMES H. PIERCE, OF BAY CITY, MICHIGAN, ASSIGNOR TO JOHNSON BROTHERS ENGINEERING CORPORATION, OF WAUKEGAN, ILLINOIS, A CORPORATION OF INDIANA

MARINE PROPULSION DEVICE

Original No. 1,579,834, dated April 6, 1926, Serial No. 742,814, filed October 10, 1924. Application for reissue filed April 3, 1928. Serial No. 267,076.

This invention relates to improvements in marine propulsion devices, and particularly to the submerged gear case and propeller shaft housing assembly of the conventional outboard motor.

One object of the invention is to design a propeller shaft housing and gear case assembly having new and novel means for forcing the water to the water jacket of the motor and whereby the usual pump is eliminated.

Another object is to design power and propeller shaft housings of simple and substantial design, and in which water intake and overflow passages are cored in or piped to the water jacket of the motor.

A further object is to design a gear casing to eliminate the possibility of sand or water getting into the gears or propeller shaft bearings.

The above and other objects will appear as the specification progresses, reference being had to the accompanying drawings in which I have shown the preferred embodiment of my invention, and in which like reference numerals indicate like parts throughout the several views thereof.

In the drawings,—

Figure 2:
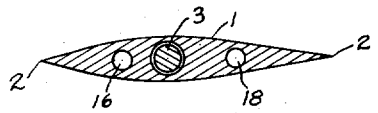
Fig. 2 is a section taken on the line 2—2 of Fig. 1.

It has always been somewhat troublesome in outboard motors to provide simple means for forcing water up to cool the cylinders of portable motors of this type, as it generally necessitates a force pump equipped with valves operated by a cam or other device, and these valves stick and grind due to the sand and foreign matter taken into the pump with the water, the pump is therefore short lived, expensive to build, and is subject to clogging, it also necessitates a bulky design which must be forced through the water, with the consequent loss of power, and these objectionable features I have overcome by eliminating the pump and providing a structure not affected by sand and foreign matter and which has no movable parts.

In my improved design I provide a vertically extending power shaft housing which can be cast of aluminum or other light metal, this is preferably wedge shaped as shown, the edges being thin and sharp to eliminate water resistance and being mounted in a well known manner to turn about a vertical axis forming a rudder for steering, the housing extending both above and below the normal water line.

A power shaft 3 is rotatably mounted in this power shaft housing which is cored to receive it, and a bushing 4 is fitted to the lower end thereof which is cored to form a gear casing, a thrust bearing 5 being mounted in this bushing, and a bevel gear 6 is keyed on the lower end of the power shaft, meshing with and driving a bevel gear 7 mounted on a propeller shaft 8, which is journaled in a propeller shaft housing 9, this housing is cylindrical in shape, the top half being cast integral with the power shaft housing, the lower half being machined and fitted thereto, and is held in place by screws (not shown) in the usual manner. Bearings 10 and 11 are mounted in this housing, and the propeller shaft 8 is journaled thereon, the one end projecting beyond the housing and having a propeller member 12 fixed thereon, the front end of the shaft being journaled in a sleeve bearing 13 formed in the housing proper. It will also be obvious that the front end or nose of the housing can be formed separate and threaded to engage the main body, or it can be bolted thereto if desired, this is however merely a detail of construction.

An intake port or opening 14 is located in the end or nose of the propeller shaft housing, and leads to a chamber 15 through which the propeller shaft extends, said chamber communicating with an upwardly extending passage 16 formed in the power shaft housing. A spiral 17 formed of thin metal, is mounted on the propeller shaft 8 in this chamber 15, and as the water enters through said port, the spiral forces it up this passage and to the water jacket of the engine, (not shown).

A similar passage 18 is formed on the opposite side of the power shaft for accommodating the overflow or discharge, and opens directly adjacent the propeller and below the water line, locating the overflow at this point also has its advantages, as the displacement of water by the propeller sets up a partial vacuum to accelerate the circulation or flow of the water in the water jacket, further, when reversing with a motor where a conventional pump is used, the supply is either entirely cut off, or reduced to such extent as to be entirely insufficient. In my improved construction a full supply is assured regardless of the direction of rotation of the motor, as the reversing thereof merely reverses the direction of flow of water to the water jacket, the propeller forcing it into the passage 18, the spiral 17 forcing it out of the intake port above described.

Figure 4:
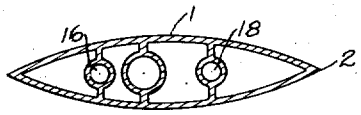
Fig. 4 is also a sectional view similar to that shown in Fig. 2 showing an alternate form of construction.
Figure 3:
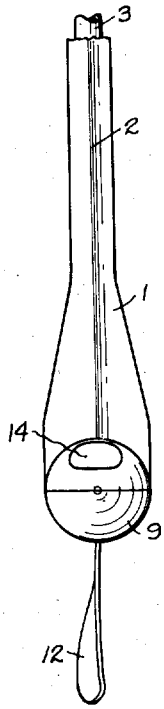
Fig. 3 is a front view thereof.
Figure 1:
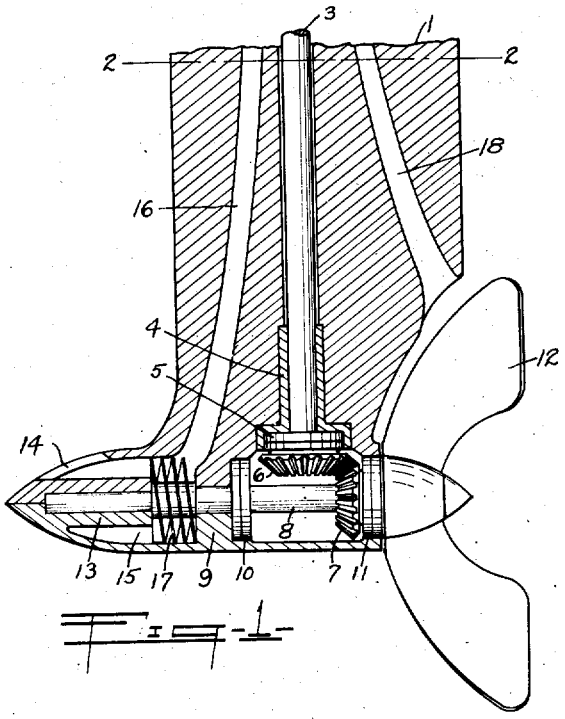
Fig. 1 is a fragmentary vertical sectional view of a power shaft housing gear case and propeller shaft housing.

In Fig. 4 of the drawings I have shown an alternate form of construction, the power shaft housing being pressed, with tubes of brass or copper secured therein for the propeller shaft and water passages, this makes a very light and economical housing, the principle being identically similar to that above described. It will also be obvious that a screen should be placed over the intake port to exclude chips, weeds and foreign matter.

From the foregoing description it will be obvious that I have perfected a very simple, substantial and economical marine propulsion device which is very efficient in operation, and is composed of a minimum number of parts.

What I claim is:

1. In a marine propulsion device provided with a vertically disposed knife edged wedge shaped power shaft housing, a propeller shaft housing, a power shaft in said power shaft housing, water intake and outlet passages adjacent the power shaft, and an intake port in the propeller shaft housing and communicating with said intake passage.

2. In a marine propulsion device provided with a vertically disposed power shaft housing, a longitudinally disposed propeller shaft housing integral therewith, water intake and outlet passages in said power shaft housing, an intake port in the propeller shaft housing and communicating with the intake passage, and a spiral interposed between said port and said passage for forcing water up said intake passage.

3. In a marine propulsion device formed with a vertically disposed power shaft housing, a longitudinally disposed propeller shaft housing integral therewith, a propeller journaled thereon, water intake and outlet passages in said housing, an outlet port opening directly adjacent the propeller, an intake port in the propeller shaft housing and communicating with the intake passage, and means mounted in the said housing for forcing water up the intake passage.

4. In a marine propulsion device provided with a power shaft housing, a propeller shaft housing formed integral therewith, intake and outlet passages in said power shaft housing, an intake port in the propeller shaft housing and communicating with the said intake passage, and a spiral interposed between said port and said passage.

5. In a marine propulsion device provided with a power shaft housing, a propeller shaft housing integral therewith, intake and outlet passages formed in said power shaft housing, an intake port in said propeller shaft housing and communicating with said intake passage, and a spiral interposed between said port and said passage for forcing water into said passage.

6. In a marine propulsion device provided with a vertically disposed wedge shaped power shaft housing having sharp edges, a gear casing on the lower end thereof, a propeller shaft housing, water intake and outlet passages adjacent the power shaft and below the normal water line, and an intake port in the propeller shaft housing and communicating with said intake passage.

7. In a marine propulsion device provided with a power shaft housing, intake and outlet passages therein, a power shaft journaled therein, a propeller shaft housing below said power shaft housing, a propeller shaft therein, and having driving connection with said power shaft, an intake port in the propeller shaft housing and communicating with the intake passage, and a spiral mounted on the propeller shaft and interposed in said passage.

8. In a marine propulsion device provided with a vertical power shaft housing, a propeller shaft housing integral therewith, intake and outlet passages in said housing, a power shaft journaled therein, and having driving connection with a propeller shaft journaled in the propeller shaft housing, a propeller mounted thereon, a spiral mounted on said shaft in the said housing, an intake port communicating with said intake passage, and a discharge port directly adjacent the propeller.

9. In a marine propulsion device provided with a vertically disposed power shaft housing, a longitudinally disposed propeller shaft housing formed integral therewith, intake and outlet passages formed in said housing and forming a continuous circuit with the water jacket of a motor, an intake port in the nose of the propeller shaft housing and communicating with the intake passage, and an outlet port in the power shaft housing directly adjacent the propeller.

10. In a marine propulsion device provided with a power shaft housing, a propeller shaft housing integral therewith, a propeller shaft journaled therein, intake and outlet passages in said housing and forming a continuous circuit with the water jacket of a motor, an intake port in the propeller shaft housing, and a spiral mounted on the propeller shaft and interposed in said intake passage.

11. In a marine propulsion device provided with a power shaft having driving connection with a propeller shaft journaled in a propeller shaft housing, intake and outlet passages adjacent said power shaft, an intake port in said gear casing and connecting with said intake passage, and a spiral mounted on the propeller shaft and interposed in said intake passage.

12. In a marine propulsion device provided with a vertically disposed knife edged symmetrical wedge shaped power shaft housing a propeller shaft housing formed integral therewith, and intake and discharge passages in said propeller shaft and power shaft housings opening below the normal water level.

13. In a device of the type described, in combination, a propeller shaft housing for an outboard motor, a propeller shaft in said housing, and a water impeller carried by and directly driven by said propeller shaft, said water impeller being completely enclosed by said housing, the nose of said housing being provided with an opening exposed to the force of the flow of water relative to said housing leading to said impeller, and said housing being provided with a passage for the discharge of water from said impeller.

14. In a device of the type described, in combination, a vertically disposed power shaft housing, a horizontally disposed propeller shaft housing carried by said power shaft housing, a power shaft in said power shaft housing, a propeller shaft in said propeller shaft housing, gears connecting said shafts, said propeller shaft housing being formed to also provide a pump chamber, said propeller shaft housing being provided with an opening leading into said chamber opening toward the normal path of water flowing toward said propeller shaft housing, a water impeller in said chamber carried by said propeller shaft and fixed against rotation relative thereto, and an engine water inlet passage in said housings for receiving water from said impeller.

15. In a marine propulsion device, in combination, a power shaft housing, a propeller shaft housing carried thereby and disposed at substantially right angles thereto, each of said housings being provided with a bore, shafts in said bores operatively connected to each other, the bore in said propeller shaft housing being enlarged adjacent the nose thereof to form a chamber surrounding the shaft therein, a water impeller of the single unit type secured to said shaft within said chamber for equal rotation therewith, a water inlet for said chamber opening on said nose in a direction to receive the force of water having a relative normal flow towards said device, and an engine water inlet passage extending from said chamber.

16. In an outboard motor construction, in combination, a vertically disposed power shaft housing, a horizontally disposed propeller shaft housing connected to the lower end thereof, a power shaft in said power shaft housing, a propeller shaft in said propeller shaft housing, a gear on said power shaft, a gear on said propeller shaft meshing with the first mentioned gears, said gears being enclosed by said housing, a water impeller of the single member type secured to said propeller shaft within said propeller shaft housing, said impeller being substantially no larger in diameter than said gear on said propeller shaft, an inlet passage leading to said impeller, and an outlet passage leading from said impeller.

17. In an outboard motor construction, in combination, a vertically disposed power shaft housing, a horizontally disposed propeller shaft housing connected to the lower end thereof, a power shaft in said power shaft housing, a propeller shaft in said propeller shaft housing, a gear on said power shaft, a gear on said propeller shaft meshing with the first mentioned gears, said gears being enclosed by said housing, a water impeller of the single rotating member type fixed to said propeller shaft in concentric relation therewith within said propeller shaft housing, said impeller being substantially no larger in diameter than said gear on said propeller shaft, an inlet passage leading to said impeller, and an outlet passage leading from said impeller.

18. In a marine propulsion device provided with a vertically disposed power shaft housing, a longitudinally disposed propeller shaft housing formed integral therewith, intake and outlet passages formed in said housing and forming a continuous circuit with the water jacket of a motor, the intake passage being disposed between the front edge of the housing and the shaft bore therein and terminating in an intake port in the nose of the propeller shaft housing, and the outlet passage being disposed between the rear edge of the housing and the shaft bore therein and terminating in an outlet port in the power shaft housing directly adjacent the propeller.

19. An outboard motor assembly wherein the propeller-carrying member forms a rudder for steering and is of stream-line construction throughout its height and extends to above the water line.

JAMES H. PIERCE.

DISCLAIMER

Re. 18,118.—*James H. Pierce*, Bay City, Mich. MARINE PROPULSION DEVICE. Patent dated July 7, 1931. Disclaimer filed March 2, 1940, by the assignee, *Outboard, Marine and Manufacturing Company*.

Hereby disclaims the subject matter of claim 19 of said reissue patent.

[*Official Gazette March 26, 1940.*]